Patented July 3, 1934

1,965,142

UNITED STATES PATENT OFFICE 1,965,142

MANUFACTURE OF SHORTENING

Edward Hall and Karl H. Goertemiller, Wyoming, Ohio, assignors to The Procter & Gamble Company, Cincinnati, Ohio, a corporation of Ohio No Drawing. Application September 11, 1933, Serial No. 688,987

3 Claims. (Cl. 99—13)

This invention relates to improvements in the manufacture or preparation of fats for use as shortening in food products and particularly to improvements in the conditioning of the shortening so that it will impart to food products containing such fat a larger volume and improved texture. This application is a continuation-in-part of our application, Ser. No. 617,039, filed June 7th, 1932.

The volume and texture of a cake, for example, are largely dependent on the amount of air which can be incorporated in the mixture before baking, and somewhat on the way in which the air bubbles are incorporated in or creamed into the dough mass. The amount of air and the manner in which it is distributed are largely dependent on the characteristics of the fat used as shortening. The creaming quality of the shortening varies greatly with different fats, and often to some extent with different lots of the same kind of fat. It is important for the baker, in order to produce a cake or other product of the largest volume for a given weight, and of the most desirable texture, to use a fat which will cream in the maximum possible amount of air in the mix, while still being of the proper consistency for good mixing at ordinary temperatures.

It is the object of our invention to provide a method of so treating the fat that it will increase very materially the maximum volume of cake or other product thus obtainable while retaining a desirable texture, and at the same time to obtain a far greater uniformity in different lots of the same kind of material than can otherwise be obtained.

Our invention comprises taking the fat after it has been rapidly chilled to a semi-solid condition and heating it to a temperature at which it softens slightly but does not become fluid, and then holding it at substantially this same temperature for a sufficient period of time to permit a certain change in physical condition to take place. This change apparently consists of a change in crystalline structure or a sort of "tempering" and the result is the fat thus treated will, when mixed with other ingredients in the usual bakery operations for making cake and other products, cause a larger volume of air to be incorporated in such a mixture.

In carrying out our treatment in the preferred manner, the fat is first prepared for packing in the usual manner. For example, the fat or mixture of the various oils or fats required to make a product suitable for shortening are thoroughly mixed while in a melted condition and then rapidly congealed to a semi-solid condition suitable for packing, by any of the usual procedures, such as by causing the melted fat to flow in a thin film over the surface of a rotating metal cylinder filled with cold brine or other cooling medium, which is kept at a temperature considerably lower than the congealing point of the fat, continuously scraping the congealed product from the roll, and then passing the chilled fat through a so-called "picker box" to smooth out any lumps and to incorporate a certain amount of air. This material is then ready for packing in the usual manner of the present art, but the rapid chilling is an essential preliminary step in preparing the fat for the tempering treatment.

In our improved treatment, we next pass the material, while still in a semi-solid condition, through a heating device in which it is heated to the desired temperature before entering the packages. A second picker box may be used between the heater and the packages, if desired. The material thus heated to the desired temperature and packed is then maintained at substantially the same temperature without agitation for a suitable period as described below, after which we find that the desired change is completed and the material is then ready for shipment or use, with greatly improved "creaming quality".

Any suitable heating device may be used for this purpose. One which has been found suitable consists of a common form of heat exchanger having a plurality of parallel tubes through which the fat passes while the tubes are surrounded by a heating medium consisting of hot water, steam, or other suitable medium which can be properly controlled. We find steam at low pressure very satisfactory and safe provided the material passes through the tubes with sufficient velocity so that no part of it becomes overheated.

We find that this desired effect can only be secured by first chilling to a lower temperature and then raising the temperature to the proper point. The temperature conditions in the initial chilling of the product may be varied over a considerable range. It is not necessary to apply the heat immediately after chilling; this may be done either immediately or after an interval of hours or days if more convenient.

The particular temperatures to best accomplish this change in the shortest time without danger of breaking down the structure or crystallization of the fat must be determined for each kind or grade of fat, but will usually be in the neighborhood of 80° F. or usually within about 5° above or below this temperature. The necessary temperature to accomplish the purpose is lower for such fats as nut-margarine but higher for a few fats occasionally used as shortenings, such as puff paste, for example. In any event, it should be about 5 to 15° F. below the point at which a 1-inch cube of the fat will soften sufficiently to lose its shape.

After the temperature is raised to the softening point, as described, the "creaming volume" test shows a gradual increase while the material is held at this temperature, until it reaches a maximum, which usually requires about 24 to 48 hours. Moderately longer periods do no harm. Shorter periods, even as short as 12 hours at this temperature give a considerable increase in "creaming volume" over the normal for a given fat, but usually not equal to the maximum improvement obtainable. This required temperature can best be maintained under varying weather conditions only by keeping the packed fat in a suitable room at the required temperature for the required period, although if shipped out on warm days immediately after packing, some increase in "creaming volume" would take place; it would vary, however, according to weather conditions.

Fats, after being subjected to this treatment, will be found to give much greater "creaming volume", and to be much more uniform in this respect than if not so treated. This improved property remains permanently thereafter in the fat so treated. We use the expression "creaming volume" to denote the maximum volume in cubic centimeters obtainable in mixing 100 grams of a mixture of the fat, sugar, and eggs in suitable proportions under definitely standardized conditions to make a cake as in common bakery practice.

To indicate the advantages of our conditioning treatment over the usual procedure, a melted shortening fat consisting of hydrogenated cottonseed oil to which vegetable stearine had been added to produce a desirable consistency for use as shortening, was chilled and prepared for shipment in the usual manner by being chilled on a brine-cooled roll and passed through two picker boxes in succession and then into packages for shipment. The freshly packed material in this case had a temperature of about 70° F. and a maximum "creaming volume" of about 140–150, under the standard conditions of the test. The "creaming volume" of such stock will usually rise spontaneously to some extent within a few days after packing, the increase varying in different lots, but rarely, if ever, exceeding a maximum "creaming volume" of 170 under any conditions. Another portion of the same material was then subjected to our improved procedure by passing it over the cooled roll and through the first picker box under the same conditions as before, and then through a heater located between the first and second picker boxes, so as to raise the temperature of the stock to be between 80° and 82° F. The reheated material was then packaged. Care was taken that none of the material actually melted passing through the heater. After filling, the packed material was held at about 80° F. for about 48 hours before allowing it to again cool down. In our test we found that the "creaming volume" had been increased to about 185.

The "creaming volume" thus obtained was considerably higher than would have been obtained without this conditioning treatment. The usefulness of the material to the baker was thus materially improved. Some fats will show even a greater increase in "creaming volume" than that in the above illustrations when subjected to our improved treatment. It is not necessary to cool the fat after holding it at the desired temperature for 48 hours, as stated, for the reason that the change which has taken place is of a permanent nature and is unaffected by subsequent temperature conditions or changes in conditions, provided it is not heated to a point too near its melting point, or to a point at which it will become fluid. Repeated cooling and warming due to varying storage or weather conditions have no effect on the creaming quality of fat which has been subjected to our improved treatment. It is understood in this connection that fats, when used as shortenings, are ordinarily used at such a temperature that they will mix readily with the other ingredients, being warmed if necessary when they have previously been stored at low temperatures, and it is under these conditions of actual use that we find the creaming quality has been permanently improved as stated, and is not affected by changes of temperature that may have occurred between the application of our improved treatment and actual use of the material. Every lot of the same kind of material treated in this way will show approximately the same figure for maximum "creaming volume".

Having thus described our invention, what we claim as new and desire to secure by Letters Patent, is:—

1. The process of conditioning fats to be used as shortening, which comprises cooling the melted fat from a molten to a semi-solid consistency, rapidly heating said cooled fat to a temperature from 5 to 15° F. below the temperature at which a 1-inch cube of the fat will lose its shape, then packing the said fat and maintaining approximately this same temperature condition in the packed material for at least 12 hours.

2. The process of conditioning fats to be used as shortening, which comprises cooling the fat from a molten to a semi-solid condition, rapidly heating the fat to a temperature between 75° F. and 85° F., filling the fat into shipping containers and maintaining the packed product without agitation at a temperature between 75° and 85° F. for at least 12 hours.

3. The process of conditioning lard and lard substitutes, which comprises chilling the fat from a molten to a semi-solid condition having a temperature considerably lower than the congealing point of the fat, rapidly heating the fat to a temperature at which its crystalline structure is changed, but below the temperature at which a 1-inch cube of the fat will lose its form, packing the fat in shipping containers and maintaining substantially the same temperature for a period of at least 12 hours.

EDWARD HALL.
KARL H. GOERTEMILLER.